United States Patent [19]

Engvall

[11] Patent Number: 5,178,354
[45] Date of Patent: Jan. 12, 1993

[54] TUBE HOLDER AND METHOD OF USING THE SAME

[76] Inventor: David P. Engvall, 5682 Harold Pl., Huntington Beach, Calif. 92647

[21] Appl. No.: 823,251

[22] Filed: Jan. 21, 1992

Related U.S. Application Data

[63] Continuation of Ser. No. 557,959, Jul. 25, 1990, abandoned.

[51] Int. Cl.⁵ .............................................. A47G 1/10
[52] U.S. Cl. .................................. 248/316.7; 24/3 L; 24/16 R; 248/205.3
[58] Field of Search ............... 248/316.7, 316.2, 316.3, 248/110, 113, 68.1, 231.8, 65, 205.3; 211/65, 66; 24/3 L, 563, 555, 16 R; 220/697; 215/100

[56] References Cited

U.S. PATENT DOCUMENTS

| | | | |
|---|---|---|---|
| 2,896,887 | 7/1959 | Beltz | 248/68.1 |
| 4,025,015 | 5/1977 | Kolic | 248/205.3 |
| 4,377,239 | 3/1983 | Jimae | 248/110 X |
| 4,401,156 | 8/1983 | Wojtecki et al. | 248/68.1 X |
| 4,605,190 | 8/1986 | Kanp | 248/231.8 |
| 4,715,505 | 12/1987 | DeMars | 220/635 X |
| 4,910,362 | 3/1990 | Kimer | 248/65 X |
| 4,941,594 | 7/1990 | Larson | 215/100 R X |

FOREIGN PATENT DOCUMENTS 2051293  1/1981  United Kingdom ............... 248/68.1

Primary Examiner—Ramon O. Ramirez
Attorney, Agent, or Firm—Bernard L. Kleinke; Jerry R. Potts; William Patrick Waters

[57] ABSTRACT

A tube holder is adapted for attachment to the surface of an aerosol can or the like. The holder includes a base having a pair of resilient, tube grasping members for receiving the tube therebetween.

13 Claims, 1 Drawing Sheet

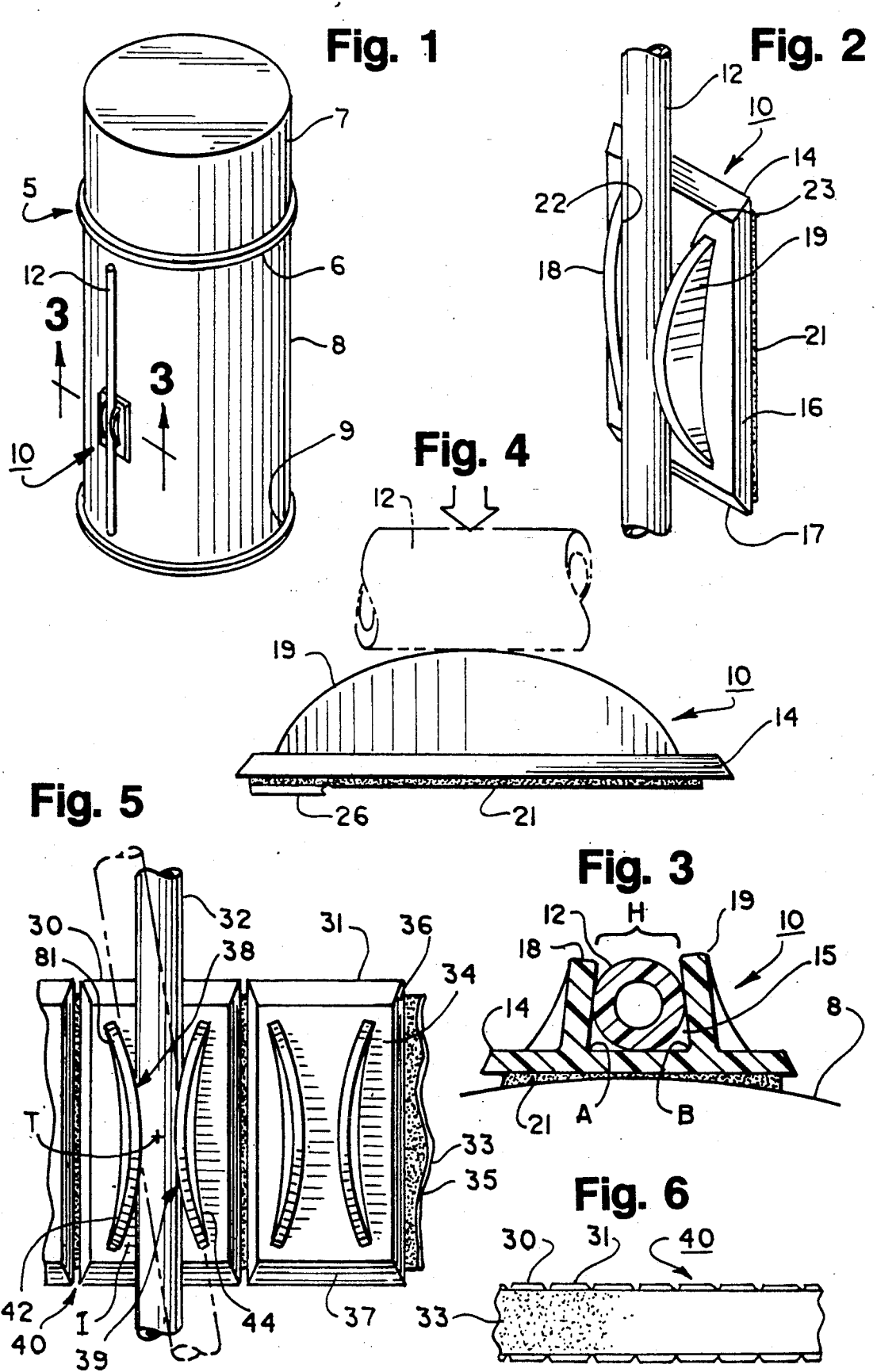

TUBE HOLDER AND METHOD OF USING THE SAME

This is a continuation, of application Ser. No. 557,959, filed on Jul. 25, 1990 now abandoned.

DESCRIPTION

1. Technical Field

The present invention relates to extension tube holders generally, and in particular, to extension tube holders for use with aerosol cans.

2. Background Art

Aerosol spray cans, containing solvents, lubricants, and the like are in common use. In a typical case, the contents of the can are under pressure, and are delivered through a very small orifice in a nozzle of a container. Generally, the substance is broadcast in a conical spray pattern which may be acceptable for some applications. However, in other cases, it is desirable to deliver the substance to a relatively inaccessible area. For example, spraying carburetor cleaner under pressure into the carburetor of a vehicle engine, requires a more confined spray pattern. Where such restricted areas are to be sprayed, broadcasting the spray of the substance can be wasteful and in some instances, ineffective. This is especially true where the user wishes to apply the substance to a desired location, without spraying adjacent surfaces.

In view of the foregoing, manufacturers of aerosol products sometimes include an extension tube for facilitating delivery of the product to a desired location. Usually, the small bore extension tube is constructed of a smooth, plastic material. It may be approximately three or four inches in length. The end of the tube is adapted to be press fitted into a conventional aerosol can spray orifice, and then the tube generally has a very small outside diameter.

Because the extension tube is used only for certain applications, it is neither practical, nor convenient, for it to be fixed in place to the aerosol can orifice. As a result, manufacturers supply the separate extension tubes with the aerosol can. In this manner, the tube can be stored, when not in use. When it is desired to be used, the tube is then manually inserted in the spray can nozzle orifice.

However, in some instances, the tube is supplied in a haphazard manner, and thus can be lost or misplaced, when not in use. In this regard, the tube may be kept separately from the can, and, at the time of purchase, the purchaser is provided with an extension tube to be used along with the can. It is readily apparent that the tube and the can can become separated, either prior to sale, or after sale. Thus, the tube can be lost. This is especially the case because of the small size of the tube.

After the consumer brings the product home, the tube may be stored in a tool box, drawer, or other container where the tube can accumulate dust, sawdust, or other undesirable or unwanted particles, which could clog the tube, or contaminate the substance being sprayed.

Because of these limitations, it would be highly desirable to have a method and means for attaching an extension tube to the aerosol can. In this manner, the tube can be packaged as a unit with the can, at the time of manufacture, so that the tube will be available for use by the consumer.

At the present time, no entirely satisfactory device exists for affixing releasably an extension tube to an aerosol can in a satisfactory manner. One conventional technique frequently employed, is to attach the tube by means of an adhesive tape strip, or, a rubber band, to the side wall of the can. With such a technique, the desirability of maintaining the tube together with the can, is recognized. However, this solution is not entirely satisfactory for all applications. It is known that tape can be removed and applied only a limited number of times repeatedly, before the tape loses its ability to adhere to the can. As to the use of the rubber band, the band itself frequently breaks, or loses its elasticity.

In an attempt to overcome such problems, a pressurizable container includes a top or cap having a slot or spacing for holding frictionally and releasably the extension tube transversely thereacross. Since the length of the tube, conventionally, is somewhat longer than the diameter of the top of the container, the tube extends beyond the edge thereof, and is thus easily dislodged and lost. Further, such an arrangement is not suitable for modern retail product distribution, because the transversely extending tube requires excessive shelf and storage space, as compared to such a container without the tube. Such limitations also make the slotted cap unsuitable for the user for some applications, since home or workshop shelf space is oftentimes limited. In addition, when the aerosol can is placed in an enclosed area, such as in a drawer or tool box, the slotted cap has little or no usefulness, since the tube can be easily dislodged, and lost.

In the use of conventional techniques for securing the thin rod-like member to a can, the requirements of the manufacturer, and those of the user, are not always in complete agreement. From the manufacturer's point of view, there may be the necessity of attaching tubes to cans in a repetitive manner, at very high speeds, where substantial numbers of units of a product are processed in relatively short periods of time.

From the point of view of the user, however, a tube holder should permit repetitive removal and insertion of the tube, over prolonged periods of time, in a relatively easy and reliable manner. For replacement, the thin rod-like tube may be slippery, or covered with an oily substance, after use, thereby making the replacement of the tube more of a problem for the user.

Thus, in the high speed manufacturing process where attempts may be made to attach the tube to a can at a high rate of speed, the manufacturer may find it expedient to attach the tube by means of an adhesive tape, or a rubber band. These measures, however, are unsatisfactory during repetitive use of the aerosol can by the user. The adhesive tape presents difficulties for the consumer to use because the tape sticks to the tube and makes it difficult to remove the tube, without removing the tape. Further, after use, it is difficult for the user to reinsert the tube so as to engage accurately the tube engaging loop formed in the tape. In addition, after use, the tube may be wet with a solvent which, over a relatively short period of time, can cause the tape to peel away from the can. In the case of rubber bands, there is a likelihood of the band becoming separated from the can. In addition, over time, a rubber band may deteriorate and lose its elasticity, especially if exposed to the solvents and lubricants commonly sold in aerosol cans.

In view of the above, the use of tape or rubber bands for attaching tubes to aerosol cans may be acceptable to the manufacturer, such use presents serious limitations from the viewpoint of the user. In this regard, it would be highly desirable to have a device which could be applied to cans having high speed manufacturing processes yet which could be utilized by the consumer, repetitively and conveniently over long periods of time. Further, it would be very advantageous if such a device could enable the user to snap the thin rod like tube into a securely held condition, in an easy one-handed operation.

Various types of other conventional tube holders have been employed. Reference may be made to U.S. Pat. Nos. 307,761; 2,744,649; 3,387,341; 3,576,304; 3,768,634; 4,025,015; and 4,576,664.

While such conventional devices have utility in holding pencils, tubing, brooms and the like, they are not adapted for attachment to a cylindrical aerosol can surface, nor are they suitable for holding a typical, thin extension tube releasably and securely.

In view of the above limitations of conventional devices, it would be highly desirable to have an extension tube holder which could securely and releasably mount an extension tube to an exterior surface of an aerosol can. In addition, it would be desirable to have such a device which would be utilized in a convenient and compact manner, while causing the tube to occupy little or no additional valuable shelf or storage space.

DISCLOSURE OF INVENTION

It is one of the principal objects of the present invention to provide an extension tube holder which can be mounted to an aerosol can or container, for holding releasably an extension tube in a secure manner.

It is another object of the present invention to provide an extension tube holder for holding an extension tube releasably in close proximity to an exterior surface of the can in a compact manner, to enable the combination of the tube and the can to be stored in small spaces.

Briefly, the above and further objects of the present invention are realized by providing a tube holder, which can be affixed to the exterior surface of an aerosol container, in a firm, reliable manner.

An extension tube holder includes a base for attachment to the surface of an aerosol can, and a pair of upstanding tube grasping members which are composed of resilient material, and which are inclined toward one another. The members includes a pair of spaced apart, oppositely disposed surfaces for receiving an extension tube therebetween. A clearance space between the tube receiving surfaces is slightly less than the outside diameter of the tube, thereby enabling the tube to be gripped in a secure, releasable manner. In addition, the tube grasping members have tube aligning portions to enable the user to align the tube with the space in a convenient, reliable manner.

The present invention has many advantages heretofore unknown in the art. In the first plate, it is adapted for secure attachment to the external cylindrical wall of a conventional aerosol can. Secondly, the grasping members hold the extension tube securely and releasably, in close proximity to the can surface, thereby reducing storage and shelf space requirements and reducing the likelihood of accidental dislodgment of the tube from the holder. In addition, the self aligning portions of the grasping members provide for axial alignment in a convenient and reliable manner.

In addition to the above advantages, the extension tube holder of the present invention provides an effective, aesthetically pleasing device which can be constructed from conventional, low cost materials.

BRIEF DESCRIPTION OF DRAWINGS

The above mentioned and other objects and features of this invention and the manner of attaining them will become apparent, and the invention itself will be best understood by reference to the following description of the embodiments of the invention, in conjunction with the accompanying drawings, wherein:

FIG. 1 is a pictorial depicting a tube holder, which is constructed according to the present invention, the holder being illustrated as being attached to the side of a conventional aerosol can;

FIG. 2 is an enlarged pictorial view of the holder of FIG. 1;

FIG. 3 is an enlarged sectional view of the holder of FIG. 1 taken on line 3—3 thereof;

FIG. 4 is an enlarged side elevational view of the holder of FIG. 1, depicting, in phantom, a portion of the extension tube in the process of being inserted therein;

FIG. 5 is a top plan view of a series of like holders, similar to the holder of FIG. 1, which are secured together to form a unit, which is constructed according to the present invention, and which is useful in the application to a series of cans during assembly operations; and FIG. 6 is a reduced scale bottom plan view of the unit of FIG. 5.

BEST MODE FOR CARRYING OUT THE INVENTION

Referring now to the drawings, and more particularly to FIG. 1 thereof, there is shown a new tube holder 10, which is constructed in accordance with the present invention. The tube holder 10 is adapted to be attached to a conventional aerosol can or container 5, which has a cover or cap 7 and a body portion 8. In a typical application, the tube holder 10 is attached to the exterior surface of the body portion 8, at a position intermediate the oppositely disposed can chines 6 and 9. The tube holder 10 is generally oriented in such a manner as to hold a conventional extension tube 12, in a position parallel to the longitudinal axis of the can 5. One end of the tube 12 is adapted to be fitted into a nozzle orifice (not shown) in a nozzle (not shown) disposed atop the body portion 8, under the cap 7.

While the holder 10 is intended to be affixed to an aerosol container, and is intended to hold an extension tube, it will become apparent to those skilled in the art that the holder may be affixed to other supporting surfaces, and that the inventive holder could be adapted to support other types and kinds of rodlike members, such as broom handles, tool handles, and others.

With reference now to FIGS. 2-4, the tube holder 10 has a base 14, with an adhesive layer 21 on the underside thereof, for attaching the tube holder to the surface of the can 5. The layer 21 is in the form of a double faced tape, such as Scotch TM VHB TM acrylic foam tapes, having synthetic adhesive coatings on both sides. Generally, the adhesive layer 21 is attached to the bottom of the base 14. As best seen in FIG. 4, a teflon coated release strip 26 covers the layer and is adapted to be peeled away prior to affixing the holder to the can.

A pair of spaced apart, upstanding tube grasping members 18 and 19, are integrally connected to the top surface of the base 14. As best seen in FIG. 3, a spacing 15 between the members 18 and 19 is suitably dimensioned to receive the rodlike tube 12 therewithin. The spacing 15 has at the top edges of the members 18 and 19, a width H which is just slightly less than the outside diameter of the tube 12. As shown in FIG. 3, the members 18 and 19 are inclined slightly toward one another, and are composed of resilient material. Thus, as shown in FIG. 4, the tube 12 is forced manually into the space H, and in so doing, the members 18 and 19 are spread apart sufficiently to receive the tube therebetween. When the tube is seated in engagement with the top surface of the base 14 (FIG. 3), the members 18 and 19 snap back to their normal unstressed, or only slightly stressed condition to grip the tube therebetween. Thus, the tube 12 can be held securely within the spacing 15.

Considering now the base 14 and the grasping members 18 and 19 in greater detail, with reference to FIGS. 2–4, the members 18 and 19 project upwardly from the base 14 at angles A and B to the base 14. It has been found that the tube holder 10 functions satisfactorily when the angles A and B range from approximately 65° to 85°, with a preferred angle of approximately 82°.

The base 14 is composed of flexible material and has a suitable thickness, together with the thickness of the adhesive layer 21, to enable firm bonding or adhesion uniformly over the entire surface of the base, to the can surface, even though the can surface has irregularities. In this regard, the base 14 conforms to cans having varying diameters, and therefore the width of the base is narrow, while having sufficient bulk or substance to hold the extension tube 12 in a secure manner. In general, the thickness of the base should be approximately equal to the thickness of the members 18 and 19. The narrow width of the base permits the adhesive layer to conform to the curvature of cans of varying diameters while holding the base firmly affixed thereto. Thus, the present invention is suitable for attachment to a substantial variety of surfaces, without limiting the capacity of the gripping members 18 and 19 to hold the tube snugly.

It has been found that a base width of approximately 5/16th of an inch is preferred, while the length of the base is approximately ⅜th of an inch. The base 14 has four chamfered edges, such as the edges 16 and 17.

The grasping members 18 and 19 are each generally C-shaped in plan view, and are disposed in a back-to-back configuration. In this manner, the members 18 and 19 have tube aligning portions 22 and 23 for helping rotate the extension tube 12 into registration with the spacing 15 between the gripping members 18 and 19. Once the tube is disposed within the spacing 15, the members 18 and 19 provide a continuous line of engagement of high pressure per unit area for securing the tube 12 in place. The tube 12 is inserted in a helical motion in the direction of the base 14, and, during alignment of the tube 12 with the spacing 15, the gripping members 18 and 19 flex outwardly, thereby permitting the tube 12 to seat firmly but releasably therewithin.

During the tube insertion process, while the gripping members 18 and 19 flex outwardly to receive the tube 12, the base 14 also flexes slightly to bulge under the grasping members 18 and 19 in the direction of the tube 12. After the tube 12 is seated within the spacing 15, the forces causing flexure of the gripping members and the base are relieved, and the tube holder 10 returns to the non-flexed condition. It has been found, in a preferred form of the invention, that the thickness of the base 14 being substantially equal to the thickness of the gripping members 18 and 19 facilitates flexure in the gripping members 18 and 19 and in the base 14.

For removal of the tube 12 from the tube holder the user grasps the tube 12 at any convenient place and lifts it out of the spacing 15.

With reference now to FIGS. 5 and 6, there is depicted another form of the present invention. A tube holder array or unit 40, having a plurality of like extension tube holders, such as the tube holder 30, disposed in a spaced apart manner, along an adhesive layer or strip 33 which is similar to the adhesive layer 21 of the tube holder 10. The adhesive layer 33 secures together the holders in preparation for attachment to aerosol cans, such as the can shown in FIG. 1. The layer 33 is covered by a release strip 35 which can be peeled away, prior to use, to expose the layer 35. The tube holders 30 and 31 have chamfered edges, such as the edges 36 and 37, for permitting the tube holder array 40 to be flexed longitudinally inwardly or outwardly, so as to fit conveniently within the magazine (not shown) of a hand-held tube holder applicator device (not shown), or an automated application machine.

Each of the tube holders is similar to one another, and to the holder 10 of FIG. 2. Therefore, only the holder 30 will now be described. The holder 30 has a base 34 and gripping members 38 and 39 having, respectively, self aligning portions 42 and 44. The gripping members define a groove I.

During application of the tube holder 30 to an aerosol can (not shown), the release strip 35 is peeled from the adhesive layer 33. The adhesive layer 33 is cut between the tube holders so that the tube holder 30 can be adhesively affixed to the exterior surface of the can.

It should be understood that it is preferred to attach the tubes to the holders, prior to their attachment to the cans. The attachment of the tubes to the holders, is performed in the same manner, as the tube 12 is attached to the holder 10. In this regard, the tubes are pressed into engagement with the holders in a self-aligning manner.

With reference now to FIG. 5, the details of the tube 12 insertion process are depicted. In the first step, assuming that the tube is positioned askew relative to the top edges of the members, the extension tube 32 engages the outwardly flared self aligning portion 44. In this position, the tube 32 is askew with regard to the spacing I between the members 38 and 39. The tube is pressed toward the base of the holder 30, at point T where the members 38 and 39 are disposed in closest proximity to one another. In so doing, the tube 32 rotates about the point T as it moves into registration within the spacing I. Thus, the tube is rotated in a helical motion, which is, in part, caused by the self aligning portions 42 and 44. The rotation is caused by the camming action of the smoothly curved contours of the members 38 and 39 imparting a torque to the tube 32. As shown, the portion 44 and the portion 81 impart the torque to cause the tube to rotate about T as the tube is urged into the spacing I between the flexing members 38 and 39. During this process, the gripping members 38 and 39 flex, so as to receive the tube 32.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A tube holder comprising:
    a base for attachment to a surface, means for attaching said base to a surface, said base having a pair of upstanding elongated spaced-apart resilient tube grasping members inclined toward one another, the opposed surfaces of said members defining a spacing for receiving a tube therebetween, wherein said members are generally C-shaped and disposed back to back and wherein each of said tube grasping members has aligning means for camming a tube to cause it to rotate into alignment with the longitudinal axis of said holder, one of said C-shaped members having its aligning means being sufficiently elongated along its longitudinal axis and of a sufficiently large radius of curvature greater than the spacing between said C-shaped members at their closest proximity to one another to provide a curved cam surface to urge one side of the tube into proper alignment with said spacing, and the other one of said C-shaped members being sufficiently elongated along its longitudinal axis and of a sufficiently large radius of curvature greater than the spacing between said C-shaped members at their closest proximity to one another to provide another cam surface to urge the opposite side of the tube into said proper alignment so that a torque is applied by the cam surfaces to the tube to impart a rotation to it about an axis of an applied force directed to the tube to urge it into a position between the members, each one of said C-shaped members having a top edge in its side view extending in a smoothly curvilinear manner between an apex and terminating at its ends substantially at said base, to impart rotational forces during a camming operation from said top edge toward said base in a smooth helical path of travel, so that the tube can be moved into said spacing to be held securely therewithin and flat against said base.

2. A tube holder of claim 1, in which said base has adhesive means for fixing said base to a surface.

3. A tube holder of claim 1, wherein said base has chamfered edges.

4. A tube holder of claim 1, in which each of said grasping members joins said base to form an angle of about 82° between each of said members and said base.

5. A tube holder of claim 1, wherein said base is composed of flexible thermoplastic material, each of said grasping members being composed of flexible thermoplastic material and having a uniform thickness throughout the length thereof, said thickness being substantially equal to the thickness of said base to permit it to flex.

6. A tube holder of claim 1, in which each of said grasping members joins said base to form an angle of approximately 90° between each of said members and said base.

7. A tube holder of claim 1, in which each of said grasping members joins said base to form an angle of less than 90° between each of said members and said base.

8. A tube holder according to claim 1 wherein said radius of curvature of each of said C-shaped members is more than twice the distance between said C-shaped members at their closest proximity to one another.

9. A method of using a tube holding device according to claim 1, said members having tube aligning means, comprising:
placing the tube against the apexes of the tube aligning means;
urging the tube into a position between the gripping means by applying a centrally directed force on the tube toward the members to urge the tube against the apex of each of the members;
continuing to apply the centrally directed force to cause the tube to follow the tube aligning means to apply a torque to the tube so that it commences rotation toward an aligned position relative to said members said rotation allowing the tube to move toward said base in a smooth helical path of travel;
continuing to apply said force until the rotating tube is aligned properly with the members as it moves therebetween; and
continuing to apply said force until the aligned tube is properly seated flat against the base between said members.

10. A method of claim 9, further including:
separating the tube from the gripping means.

11. An elongated adhesive strip having a plurality of extension tube holders fixed to said strip, each of said holders having a base for attachment to a surface, means for attaching said base to a surface, said base having a pair of upstanding elongated spaced-apart resilient tube grasping members inclined toward one another, the opposed surfaces of said members defining a spacing for receiving a tube therebetween, wherein said members are generally C-shaped and disposed back to back and wherein each of said tube grasping members has aligning means for camming a tube to cause it to rotate into alignment with the longitudinal axis of said holder, one of said C-shaped members having its aligning means being sufficiently elongated along its longitudinal axis and of a sufficiently large radius of curvature greater than the spacing between said C-shaped members at their closest proximity to one another to provide a curved cam surface to urge one side of the tube into proper alignment with said spacing, and the other one of said C-shaped members being sufficiently elongated along its longitudinal axis and of a sufficiently large radius of curvature greater than the spacing between said C-shaped members at their closest proximity to one another to provide another cam surface to urge the opposite side of the tube into said proper alignment so that a torque is applied by the cam surfaces to the tube to impart a rotation to it about an axis of an applied force directed to the tube to urge it into opposition between the members, each one of said C-shaped members having a top edge in its side view extending in a smoothly curvilinear manner between an apex and terminating at its ends substantially at said base, to impart rotational forces during a camming operation from said top edge toward said base in a smooth helical path of travel, so that the tube can be moved into said spacing to be held securely therewithin and flat against said base.

12. An elongated adhesive strip according to claim 11, in which each base of each said holders has at least one chamfered edge.

13. A method of fixing a tube holder of the strip of claim 11 to individual surfaces, comprising:
selecting a tube holder;
locating a place on one of said surfaces for attaching the holder thereto;
attaching said holder to said surface;
separating said holder from the strip; and
selecting, attaching and separating another one of the holders from the strip to another surface.

* * * * *